(12) United States Patent
Quennesson

(10) Patent No.: US 8,395,660 B2
(45) Date of Patent: Mar. 12, 2013

(54) THREE-DIMENSIONAL MOVIE BROWSER OR EDITOR

(75) Inventor: Kevin Quennesson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1119 days.

(21) Appl. No.: 11/956,286

(22) Filed: Dec. 13, 2007

(65) Prior Publication Data

US 2009/0153648 A1 Jun. 18, 2009

(51) Int. Cl.
*H04N 7/18* (2006.01)
*G06F 15/16* (2006.01)

(52) U.S. Cl. .......................................... 348/51

(58) Field of Classification Search ............... 348/51–53
See application file for complete search history.

(56) References Cited

U.S. PATENT DOCUMENTS

| | | | | |
|---|---|---|---|---|
| 5,977,978 A | * | 11/1999 | Carey et al. | 345/419 |
| 6,429,867 B1 | * | 8/2002 | Deering | 345/423 |
| 6,721,952 B1 | * | 4/2004 | Guedalia et al. | 725/38 |
| 7,116,324 B2 | * | 10/2006 | Kaye et al. | 345/419 |
| 7,839,385 B2 | * | 11/2010 | Hunleth et al. | 345/158 |
| 7,957,547 B2 | * | 6/2011 | Chin | 381/306 |
| 2005/0243278 A1 | * | 11/2005 | Li et al. | 352/57 |
| 2006/0268105 A1 | * | 11/2006 | Jacobs et al. | 348/53 |
| 2007/0070066 A1 | * | 3/2007 | Bakhash | 345/419 |
| 2007/0103546 A1 | * | 5/2007 | Collender et al. | 348/51 |
| 2008/0019662 A1 | * | 1/2008 | Scherlis et al. | 386/52 |
| 2008/0178087 A1 | * | 7/2008 | Fitzgibbon et al. | 715/723 |
| 2009/0116732 A1 | * | 5/2009 | Zhou et al. | 382/154 |

* cited by examiner

*Primary Examiner* — Zarni Maung
(74) *Attorney, Agent, or Firm* — Schwegman Lundberg & Woessner, P.A.

(57) ABSTRACT

A three-dimensional movie browser or editor is disclosed. In one aspect, video frames are quads in space. A movie plays at full quality by moving the quads in space at a speed of the movie and having a camera follow the quads. A focus frame in the movie is put forward by a cover-flow/dock like expansion around it. Video frames are loaded at a resolution and with an interval that depends on their position regarding a focus point or the optical flow between the frames.

25 Claims, 16 Drawing Sheets

THREE-DIMENSIONAL MOVIE BROWSER OR EDITOR

TECHNICAL FIELD

The subject matter of this patent application generally relates to browsers or editors.

BACKGROUND

A hallmark of modern movie browsers or editors is that they display video frames of a movie in a two-dimensional display environment. The video frames are tiled in the two-dimensional display environment on a display screen. This environment may require multiple screens, or display small video frames on a single screen, making the result overwhelming. If multiple screens are used, users may find it difficult to browse through the multiple screens. If a single screen is used, the small display size of the video frames may make it difficult for users to browse or edit them. In addition, the two-dimensional display environment may make it difficult for the user to gain a holistic view of the video frames.

For example, users may find it difficult to navigate through multiple screens, or through small video frames on a single screen, to determine a focus point. Selecting video frames can also be difficult as the user may have to navigate through multiple screens, or through small video frames on a single screen, to select the video frames. The two-dimensional environment may also make it difficult for users to judge temporal distance between video frames or compare video frames. The two-dimensional environment may also use a large amount of resources as the video frames are displayed at a single resolution.

SUMMARY

A three-dimensional movie browser or editor is disclosed. In one aspect, video frames are quads in space. A movie plays at full quality by moving the quads in space at a speed of the movie and having a camera follow the quads. A focus frame in the movie is put forward by a cover-flow/dock like expansion around it. Video frames are loaded at a resolution and with an interval that depends on their position regarding a focus point or the optical flow between the frames.

Other implementations of a three-dimensional movie browser or editor are disclosed, including implementations directed to methods and computer-readable mediums.

DETAILED DESCRIPTION

Three-Dimensional Movie Browser or Editor Overview

Figure 1:
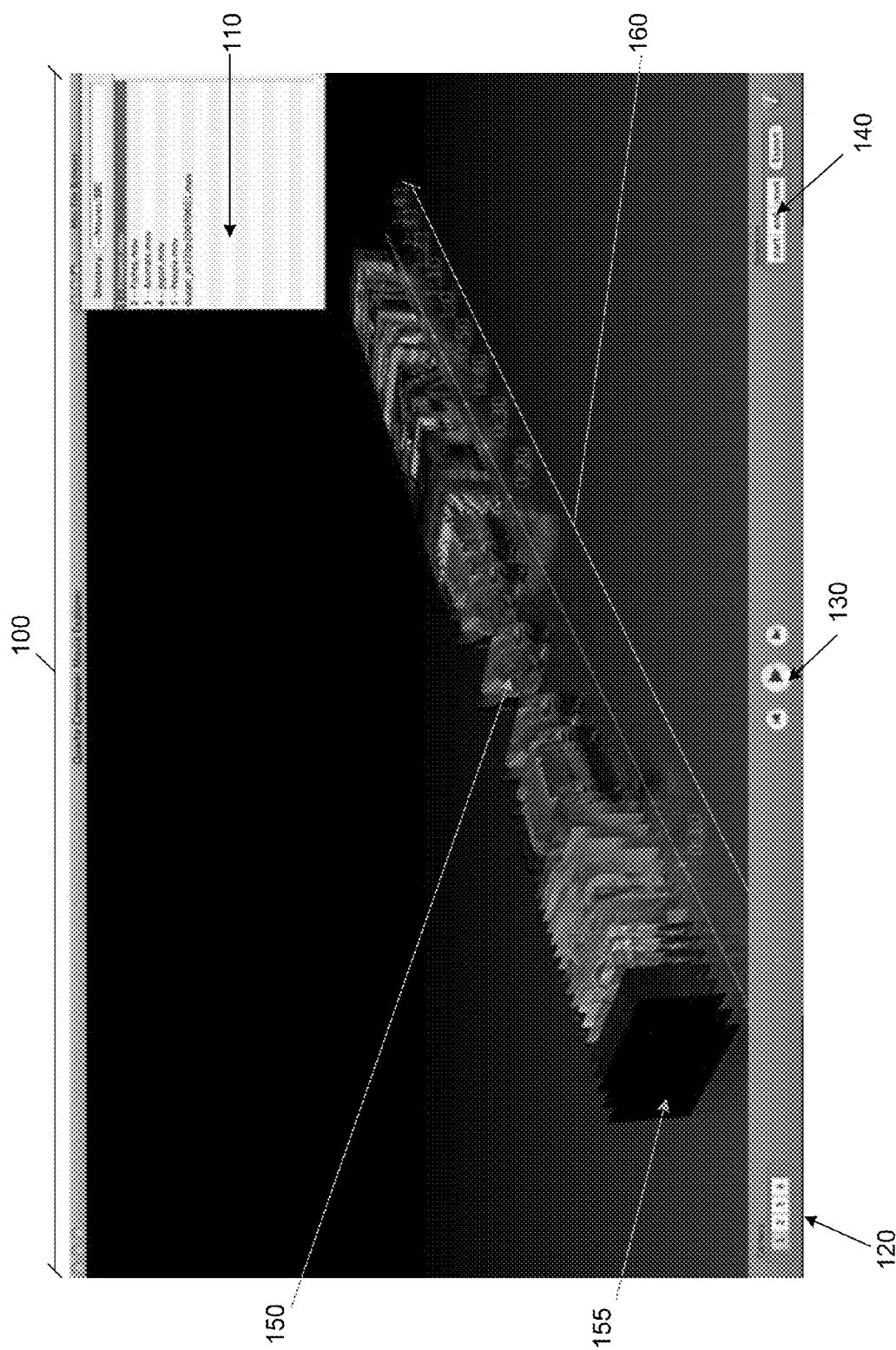
FIG. 1 is a screen shot showing a three-dimensional movie browser or editor with video frames displayed concurrently along a timeline.

FIG. 1 is a screen shot showing a three-dimensional movie browser or editor 100 (also referred to herein as a "browser") with video frames 155 displayed concurrently along a timeline 160. In particular, a focus frame 150, as described in further detail below with reference to FIG. 5, can be determined by a user as a focus point. The browser 100 is used to display and edit video frames, as described in further detail below with reference to FIGS. 2 and 3. The browser 100 can include a file browser 110. A user can obtain movie data by using the file browser 110 to locate the movie data. Video frames 155 corresponding to the movie data are then displayed concurrently, and in temporal order, along the timeline 160 in a three-dimensional display environment, as described in further detail below with reference to FIG. 13.

The three-dimensional display environment can be implemented in many ways. In some implementations, a reflective surface is used to reinforce the three-dimensional characteristic of the environment. Reflections of video frames, image analysis tools, etc. appear in the reflective surface. In some implementations, the three-dimensional display environment is composed of blank space. For example, the environment can have a background of a pure color, e.g., black. In other implementations, the three-dimensional display environment can be displayed using a grid. For example, the background can include a visual grid that displays an x-, y-, and z-axis.

The timeline 160 is not constrained to the form of a straight line. In some implementations, the timeline is displayed in the form of a geometric shape. For example, the timeline can be displayed in the form of a rectangle, triangle, circle, or an oval. The timeline can also be displayed in the form of a linear path other than a straight line. For example, the timeline can be displayed in a parabola, sine wave, cosine wave, triangular wave, or square wave.

Video Frame Navigation and Selection

The user interacts with the browser 100 by manipulating navigational elements 120, navigational controls 130, and selection controls 140. The navigational elements 120 can allow the user to switch among different camera angles to view the three-dimensional display environment. For example, the user can view the environment from 360 degrees along any axis, e.g., FIGS. 5, 8, and 10. In some implementations, the navigational controls allow the user to zoom in on a particular area of the three-dimensional display environment, e.g., FIGS. 5 and 7-11. For example, the user can select pre-determined zoom views or the user can manually zoom in to a particular area of the three-dimensional display environment. In yet other implementations, the user uses the navigational elements to flip or rotate the video frames 155 to view them from a different angle, e.g., FIGS. 8 and 10.

Navigation controls 130 are used to control the playback speed of the movie data or video frames. Examples of such navigation controls 130 include: play, rewind, fast forward, pause, next frame, and previous frame. In some implementations, the navigational controls are used to navigate among different sets of movie data that are located by using the file browser 110. Examples of such navigation controls 130 include: next movie and previous movie.

Selection controls 140 are used to select video frames 155 from the movie data. For example, selection controls 140 can include: start, end, reset, and export. The start and end controls are used to select one or more video frames 155, and the export control is used to export these video frames as a new set of movie data.

In some implementations, the navigation controls 130 and selection controls 140 include controls relating to different user interactions. For example, touch motions (e.g., sliding a finger over the screen of an iPhone) can be used to navigate among or select video frames. As another example, pinching along the screen of an iPhone can be used to zoom in and out of views. As yet another example, one or more taps on the screen of an iPhone can be used to select video frames. As another example, the scroll wheel of an iPod can be used to navigate among and select video frames. Additional controls relating to other user interactions are possible.

In some implementations, the navigation controls 130 and selection controls 140 are used to display or edit one or more movies in the browser. For example, a user can use the file browser 110 to display a first movie and a second movie. The user can then navigate among the video frames (e.g., using the navigational controls 130), select video frames (e.g., using selection controls 140), and export video frames, for example, from the first and second movies (e.g., using the selection controls 140), to create a third movie that can be browsed or edited in the browser.

Image Editing

Figure 2:
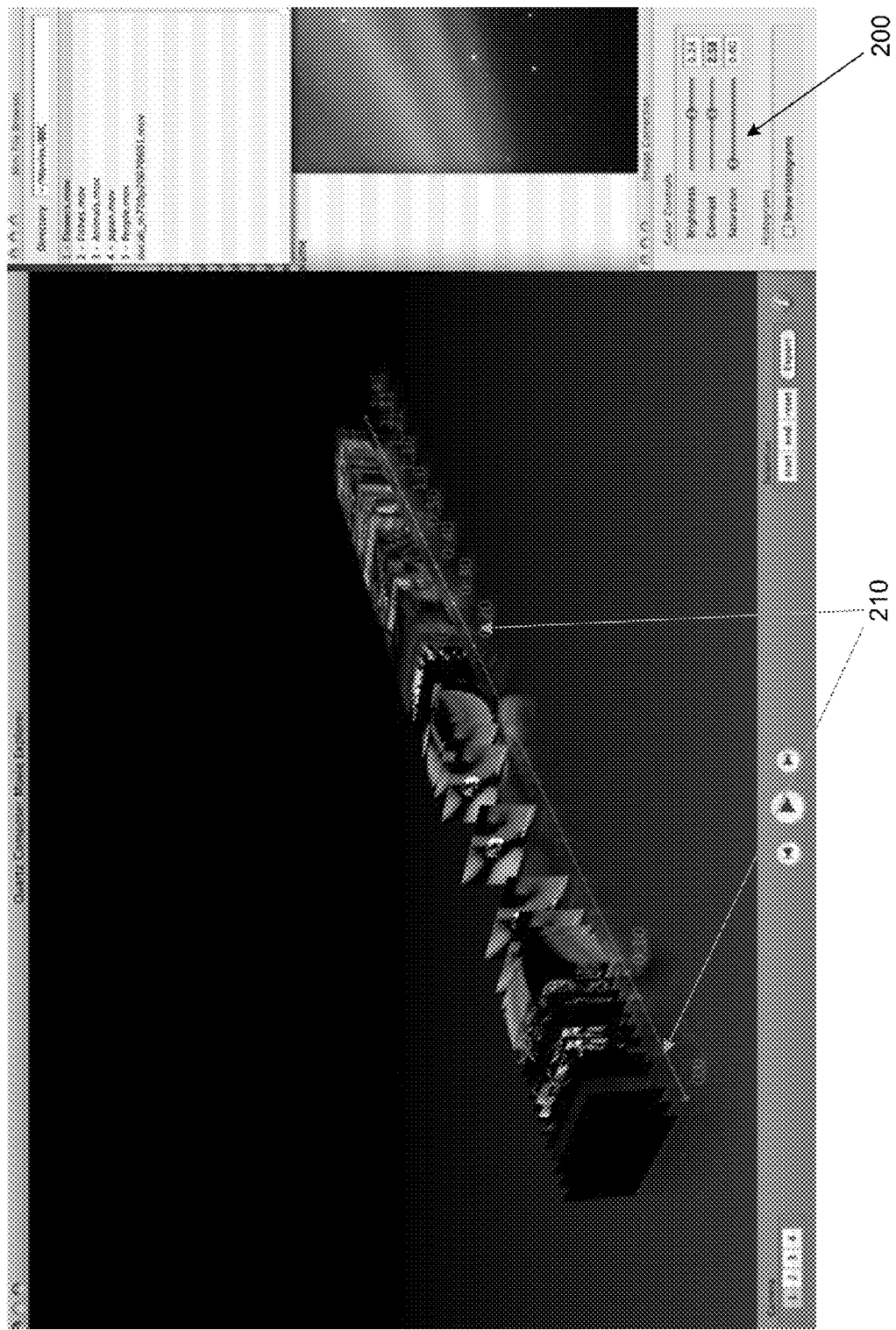
FIG. 2 is a screen shot showing the three-dimensional content browser or editor with video frames displayed concurrently along a timeline of FIG. 1 with video frames selected for image editing.

FIG. 2 is a screen shot showing the three-dimensional content browser or editor with video frames displayed concurrently along a timeline of FIG. 1 with video frames selected 210 for image editing. The user selects one or more video frames to edit using different image processing tools 200.

In some implementations, the user selects individual video frames. For example, the use can perform a mouse-click on an individual video frame to select the individual video frame. In other implementations, the user selects two points along the timeline 210. By selecting the two points along the timeline, the video frames along the portion of the timeline between the two points are selected. In yet other implementations, the user uses the selection controls 140 to select a start and end time on the timeline. By selecting the two times on the timeline, the video frames along the portion of the timeline between the two times are selected.

After video frames are selected, image processing tools 200 are used to edit the selected video frames. Examples of image processing controls include: geometric transformations such as enlargement, reduction and rotation; color corrections such as brightness and contrast adjustments, quantization, or conversion to a different color space; registration or alignments of images; combinations of images; interpolation and demosaicing of images; image segmentation; image editing and digital retouching; noise removal; and image restoration such as deconvolution.

Image Analysis

Figure 3:
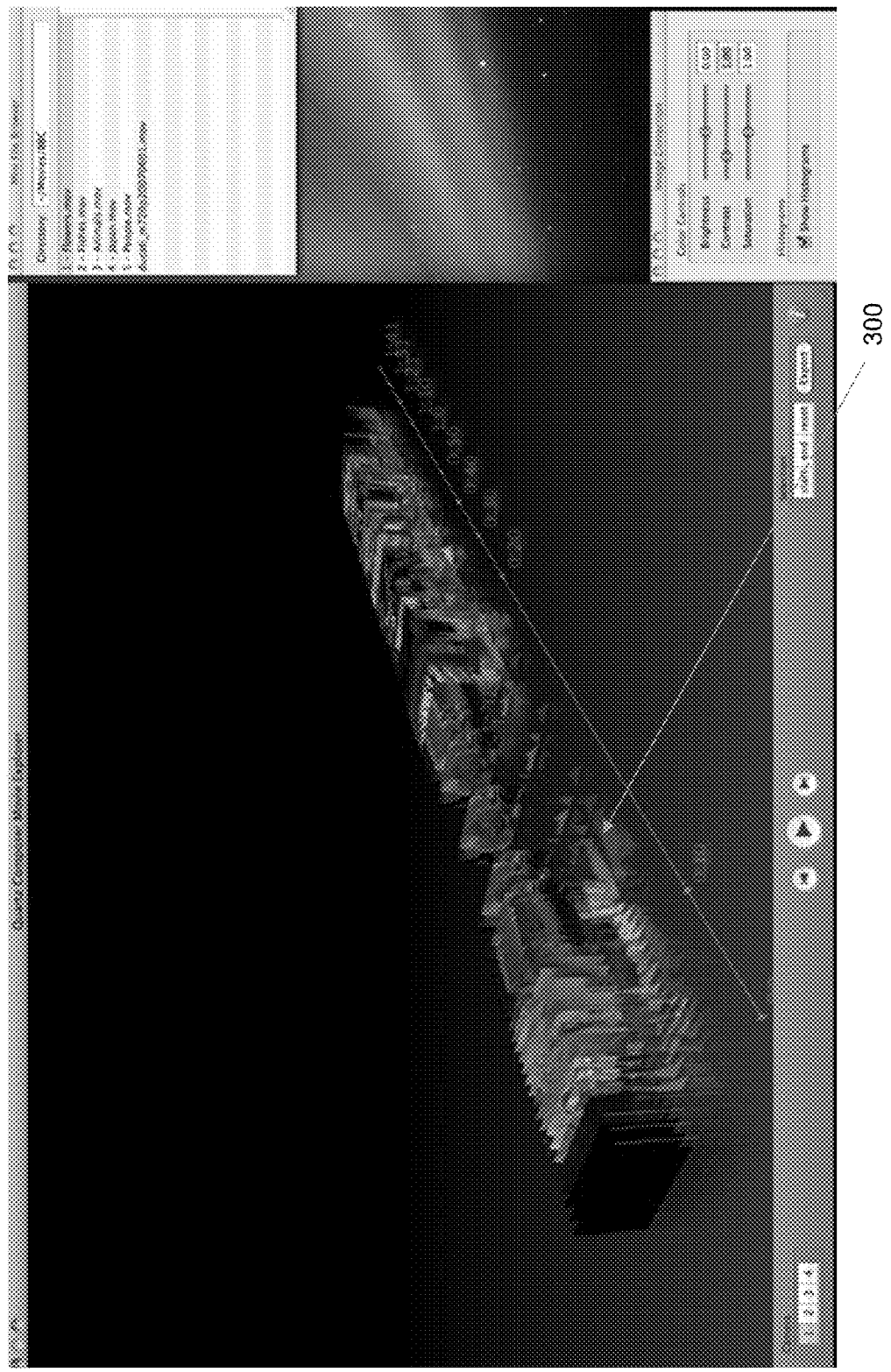
FIG. 3 is a screen shot showing the three-dimensional content browser or editor with video frames displayed concurrently along a timeline of FIG. 1 with image analysis tools displayed along the timeline proximate to the video frames.
Figure 4:
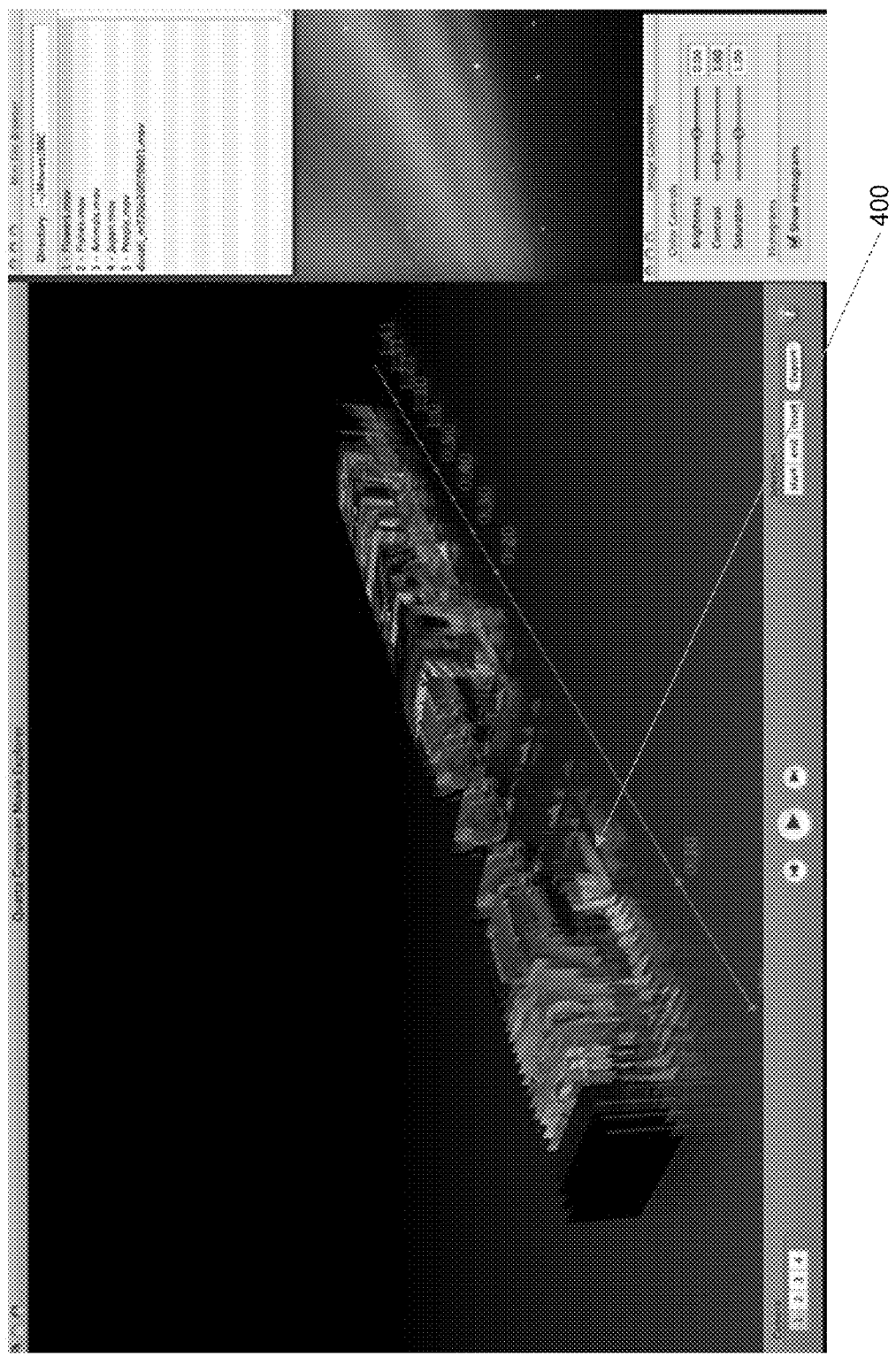
FIG. 4 is a screen shot showing the video frames displayed concurrently along a timeline with image analysis tools displayed along the timeline proximate to the video frames of FIG. 3 at a zoomed-in view.

FIG. 3 is a screen shot showing the three-dimensional content browser or editor with video frames displayed concurrently along a timeline of FIG. 1 with image analysis tools 300 displayed along the timeline proximate to the video frames. FIG. 4 shows another view of the screenshot in FIG. 3. FIG. 4 is a screen shot showing the video frames displayed concurrently along a timeline with image analysis tools 400 displayed along the timeline proximate to the video frames of FIG. 3 at a zoomed-in view.

Image analysis tools (e.g., histogram 300 and histogram 400) allow a user to analyze information from the video frames. In addition, image analysis tools can be used to monitor the information from the video frames as they are edited. Examples of image analysis tools include: image histograms, image projections, image apertures, image profiles, image scattergrams, motion graphs (e.g., graphs that show the optical flow or amount of motion between frames), and image transforms (e.g., Hough Transforms and Fast Fourier Transforms).

In some implementations, the image analysis tools can be displayed by using controls for the image processing tools 200. For example, a color correction tool can have a check-box to display image histograms. When the check-box is enabled, image histograms (e.g., histogram 300 and histogram 400) are displayed along the timeline proximate to the video frames. In some implementations, the image analysis tools can have independent display controls.

Image analysis tools can be displayed in various locations in the three-dimensional display environment. In some implementations, an image analysis tool is displayed above the timeline proximate to the video frame it analyzes. In some implementations, the image analysis tool is displayed in front of the timeline proximate to the video frame it analyzes. Alternatively, the image analysis tool can also be displayed behind the video frame it analyzes. The image analysis tool can also remain hidden from the user's view until the user selects a video frame or determines a focus frame. Upon selection of a video frame or determination of a focus frame, the image analysis tool is displayed proximate to the video frame it analyzes.

Focus Frame

Figure 5:
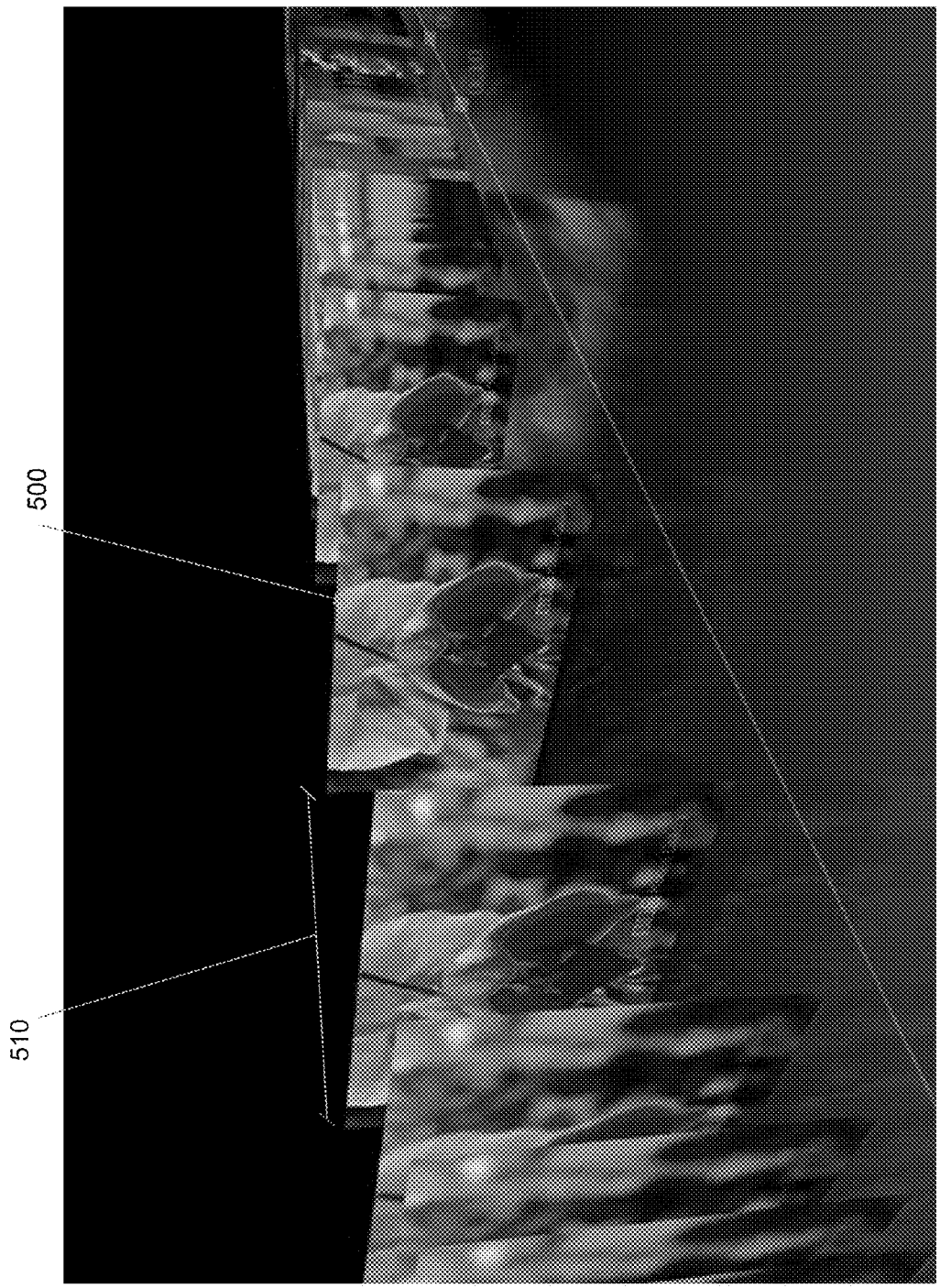
FIG. 5 is a screen shot showing a zoomed-in view of a timeline at a location of a focus frame.
Figure 7:
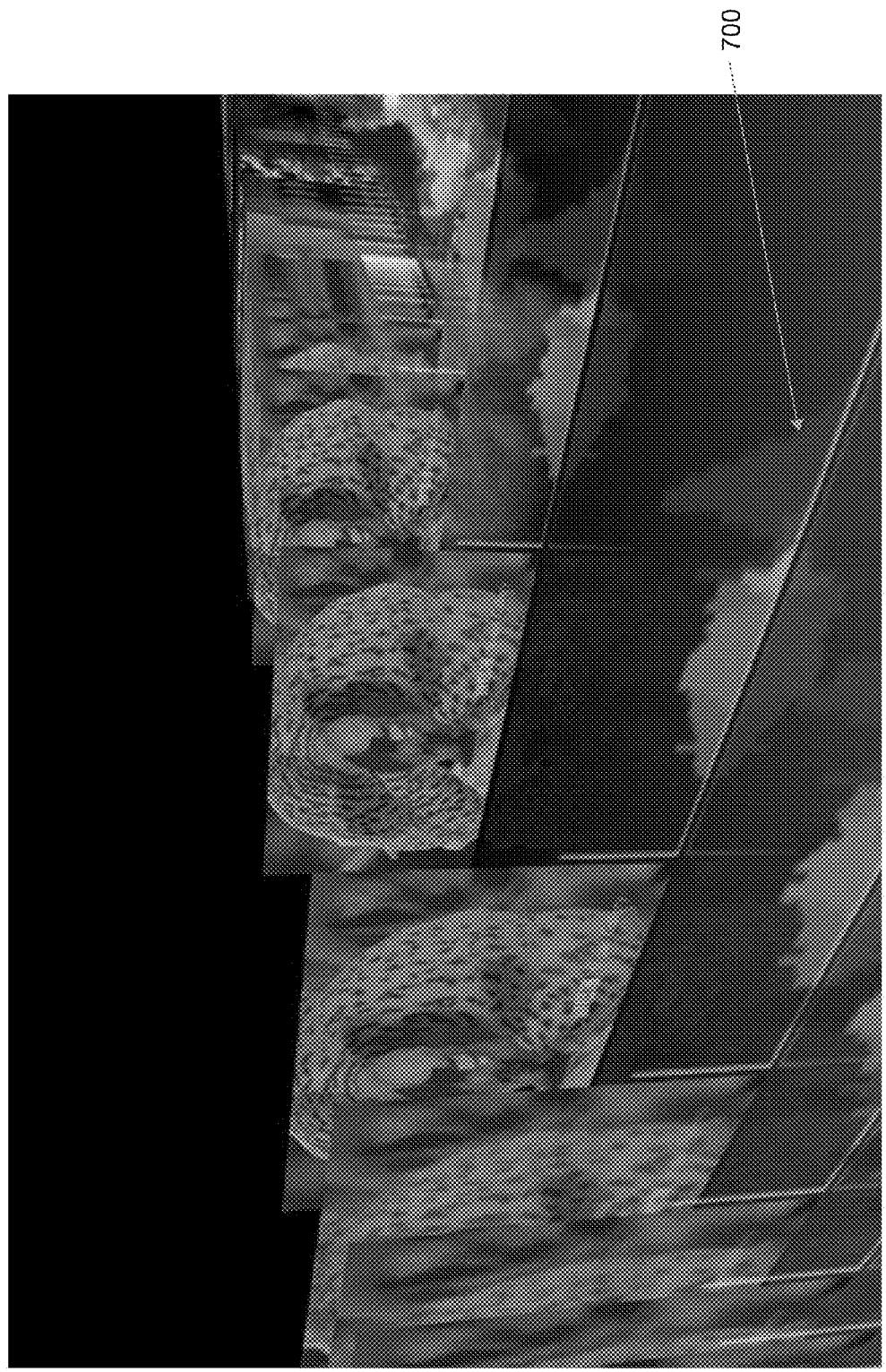
FIG. 7 is a screen shot showing a zoomed-in view of a timeline at a location of a focus frame with image analysis tools displayed along the timeline proximate to video frames.

FIG. 5 is a screen shot showing a zoomed-in view of a timeline at a location of a focus frame 500. FIG. 7 shows another view of the screenshot in FIG. 5. FIG. 7 is a screen shot showing a zoomed-in view of a timeline at a location of a focus frame with image analysis tools 700 displayed along the timeline proximate to video frames.

Returning to FIG. 5, the user determines a focus frame 500 as a focus point. For example, the user can hover a cursor over a particular video frame, and that video frame becomes a focus frame. In some implementations, the user can hover a cursor over a time along the timeline proximate to a video frame, or use navigational controls to pause at a certain time corresponding to a video frame. This video frame becomes a focus frame. In other implementations, the user can perform a mouse click upon a video frame to determine the focus frame. In yet other implementations, users can determine more than one focus frame. Furthermore, the three-dimensional movie browser or editor can also determine a video frame to be a default focus frame.

Display Intervals

After a focus frame is determined, the video frames are displayed at an interval on the timeline.

The interval 510 can depend on the relative position of the video frames to the focus frame 500. In some implementations, the interval decreases as the temporal distance between the video frames and the focus frame increases. For example, a first video frame located immediately in time before the focus frame is displayed at a first interval relative to the focus frame. A second video frame located immediately in time before the first video frame is displayed at a second interval relative to the first video frame. The second interval is smaller than the first interval. A third video frame located immediately in time before the second video frame is displayed at a third interval relative to the second video frame. The third interval is smaller than the second interval. The intervals for the frames located in time after the focus frame are displayed in a similar manner, based on the temporal distance between the video frames and the focus frame. The size of the interval decreases as the temporal distance between a video frame and the focus frame increases. In other implementations, the first interval is larger than the second interval, but the remaining intervals are equal to the second interval.

Alternatively, the interval can depend on the optical flow, or amount of motion, between the frames. Displaying the video frames at an interval depending on the optical flow between the video frames allows a user to more easily view the most significant information of the video frames (e.g., a new movie shot or a change in a movie shot) while still viewing temporal information (e.g., how long a movie shot lasts and where the movie shot is located in the movie data).

Figure 6:
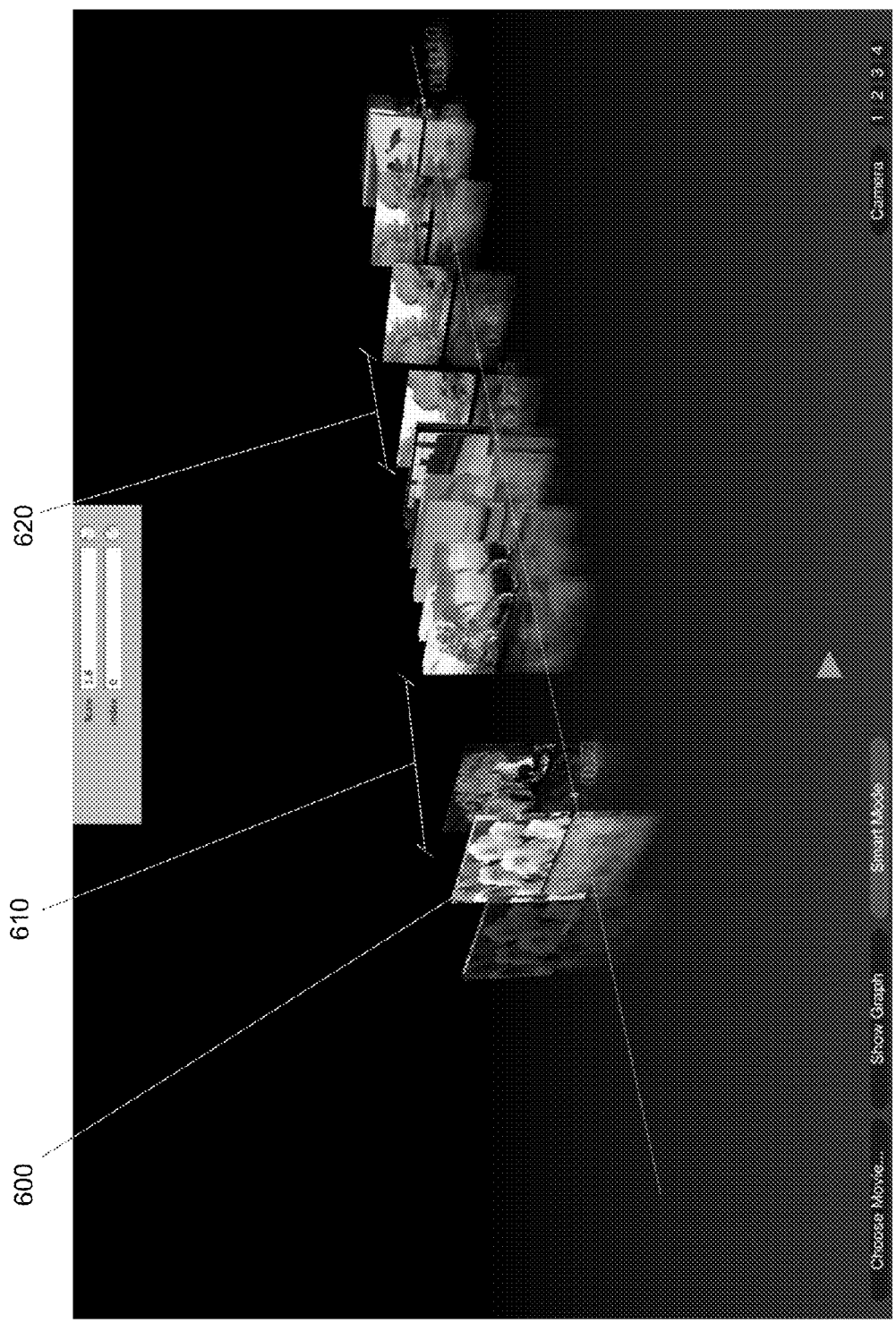
FIG. 6 is a screen shot showing a timeline where video frames are displayed at an interval depending on the optical flow between the video frames.

FIG. 6 is a screen shot showing a timeline where video frames are displayed at an interval depending on the optical flow between the video frames. Interval 600 is an interval between a first set of consecutive video frames with a first amount of motion between the first set of consecutive video frames. Interval 610 is an interval between a second set of consecutive video frames with a second amount of motion between the second set of consecutive video frames. Interval 600 is smaller than interval 610 because the amount of motion between the first set of consecutive video frames is less than the amount of motion between the second set of consecutive video frames. Interval 620 is an interval between a third set of consecutive video frames with a third amount of motion between the third set of consecutive video frames. Interval 620 is smaller than interval 610 because the amount of motion between the third set of consecutive video frames is less than the amount of motion between the second set of consecutive video frames. The size of the interval increases as the amount of motion between the frames increases.

In some implementations, the interval can be created along an axis other than the axis of the timeline. For example, the interval can be created along an axis perpendicular to the timeline, so that the interval appears to create vertical spreading among the focus frame and the other video frames.

Display Resolutions

The three-dimensional movie browser or editor can display the video frames at different resolutions. All of the video frames can be initially displayed at a first resolution. Returning to FIG. 5, after a focus frame is determined, the focus frame 500 is displayed at a second resolution. This second resolution is a greater resolution than the first resolution.

In some implementations, the second resolution is a full temporal resolution. For example, the quad that contains the focus frame can be used to play all of the video frames corresponding to the movie data. In another example, the quad that contains the focus frame can be used to play the subset of the video frames that includes the focus frame and the video frames that temporally follow the focus frame. In yet another example, the quad that contains the focus frame can be used to play the subset of video frames that includes the video frames that temporally precede the focus frame and end at the focus frame. In some implementations, the second resolution is a full image resolution.

Other Views

Figure 8:
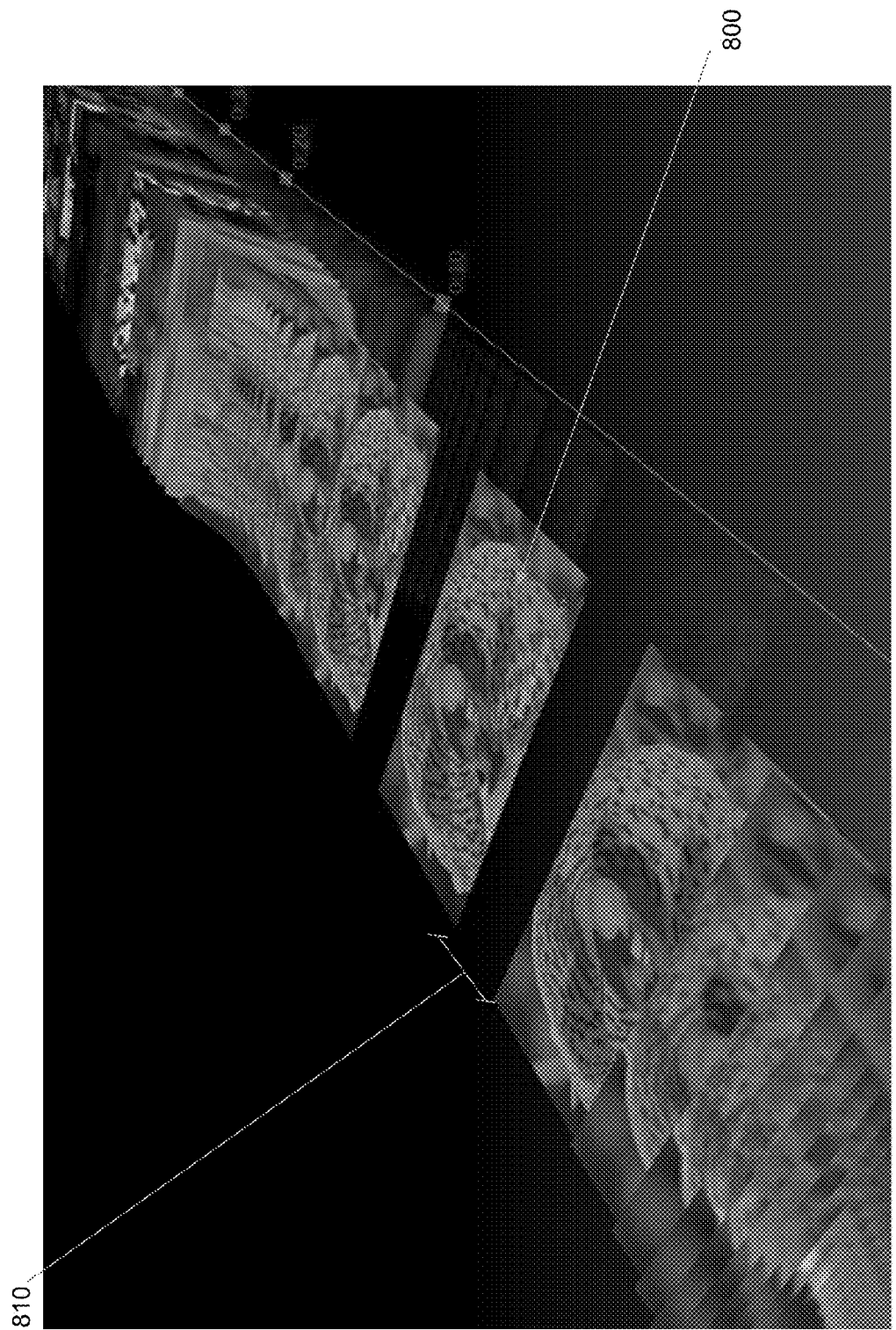
FIG. 8 is a screen shot showing a zoomed-in view of a timeline at a location of a focus frame with video frames flipped or rotated.

FIG. 8 is a screen shot showing a zoomed-in view of a timeline at a location of a focus frame 800 with video frames flipped or rotated. The user can use the navigational elements 120 to flip or rotate the video frames. In addition, the user can also use the navigational elements 120 to zoom in on the timeline. The video frames are displayed at an interval 810 along the timeline depending on the relative position of the video frames to the focus frame. In some implementations, the video frames are flipped or rotated so that the video frames are displayed horizontally, as shown in FIG. 8. In other implementations, the video frames are flipped or rotated so that the video frames are displayed vertically.

Figure 9:
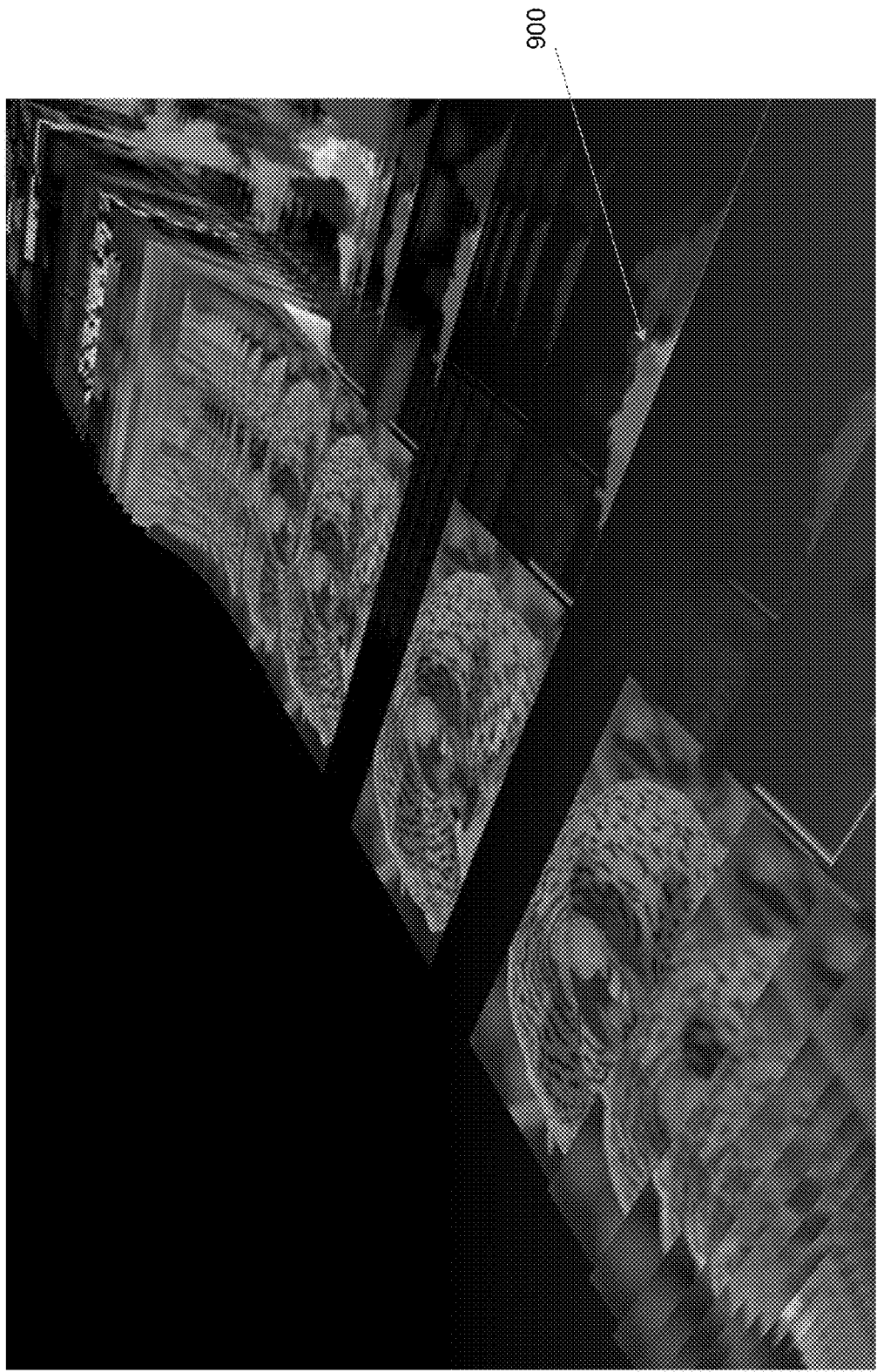
FIG. 9 is a screen shot showing the zoomed-in view of a timeline at a location of a focus frame with video frames flipped or rotated of FIG. 8 with image analysis tools displayed along the timeline proximate to the video frames.

Image analysis tools and image processing tools can still be displayed in zoomed-in views. FIG. 9 is a screen shot showing the zoomed-in view of a timeline at a location of a focus frame with video frames flipped or rotated of FIG. 8 with image analysis tools 900 displayed along the timeline proximate to the video frames.

Figure 10:
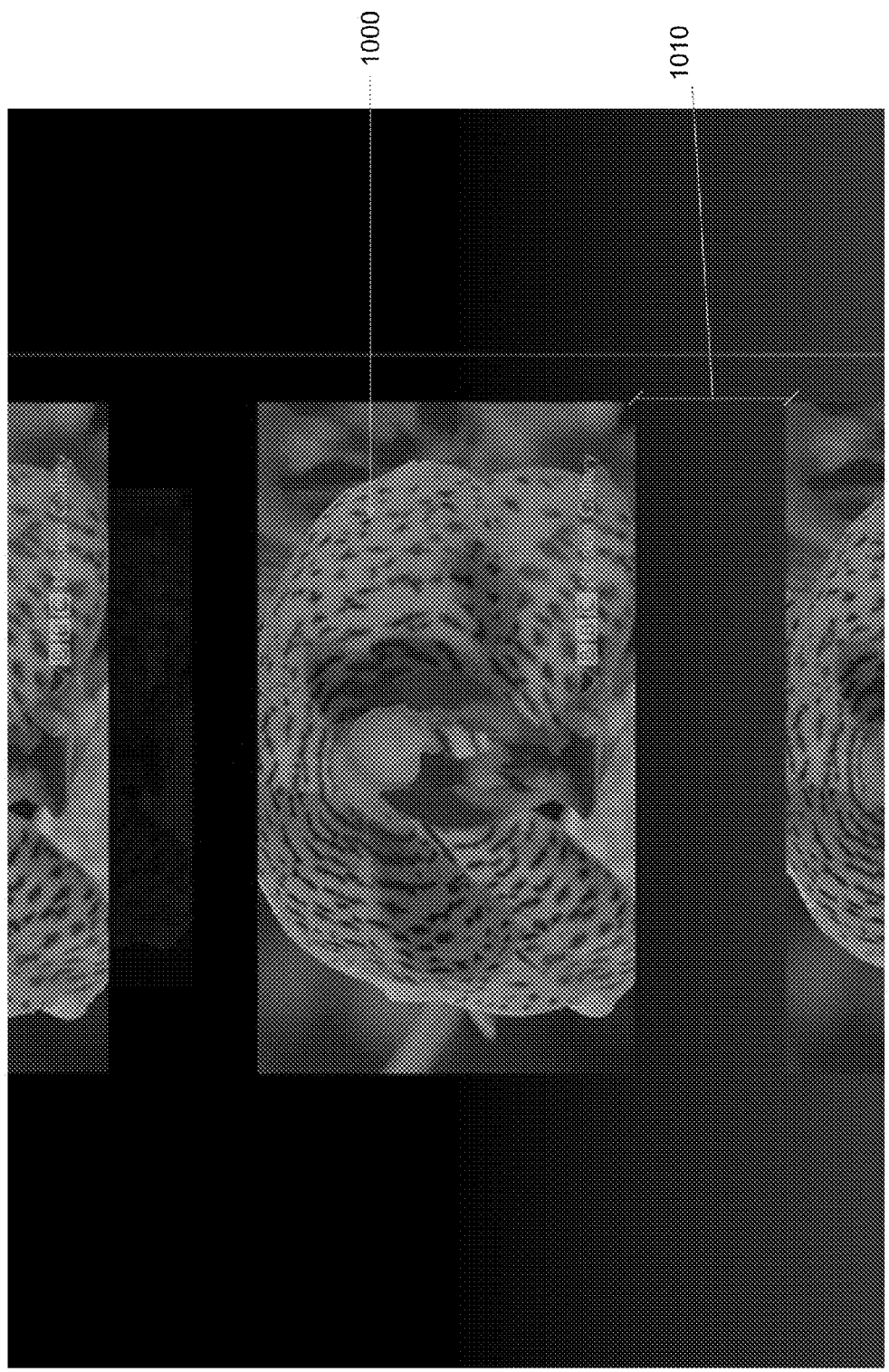
FIG. 10 is a screen shot showing an even further zoomed-in view of a timeline at a location of a focus frame with video frames flipped or rotated.
Figure 11:
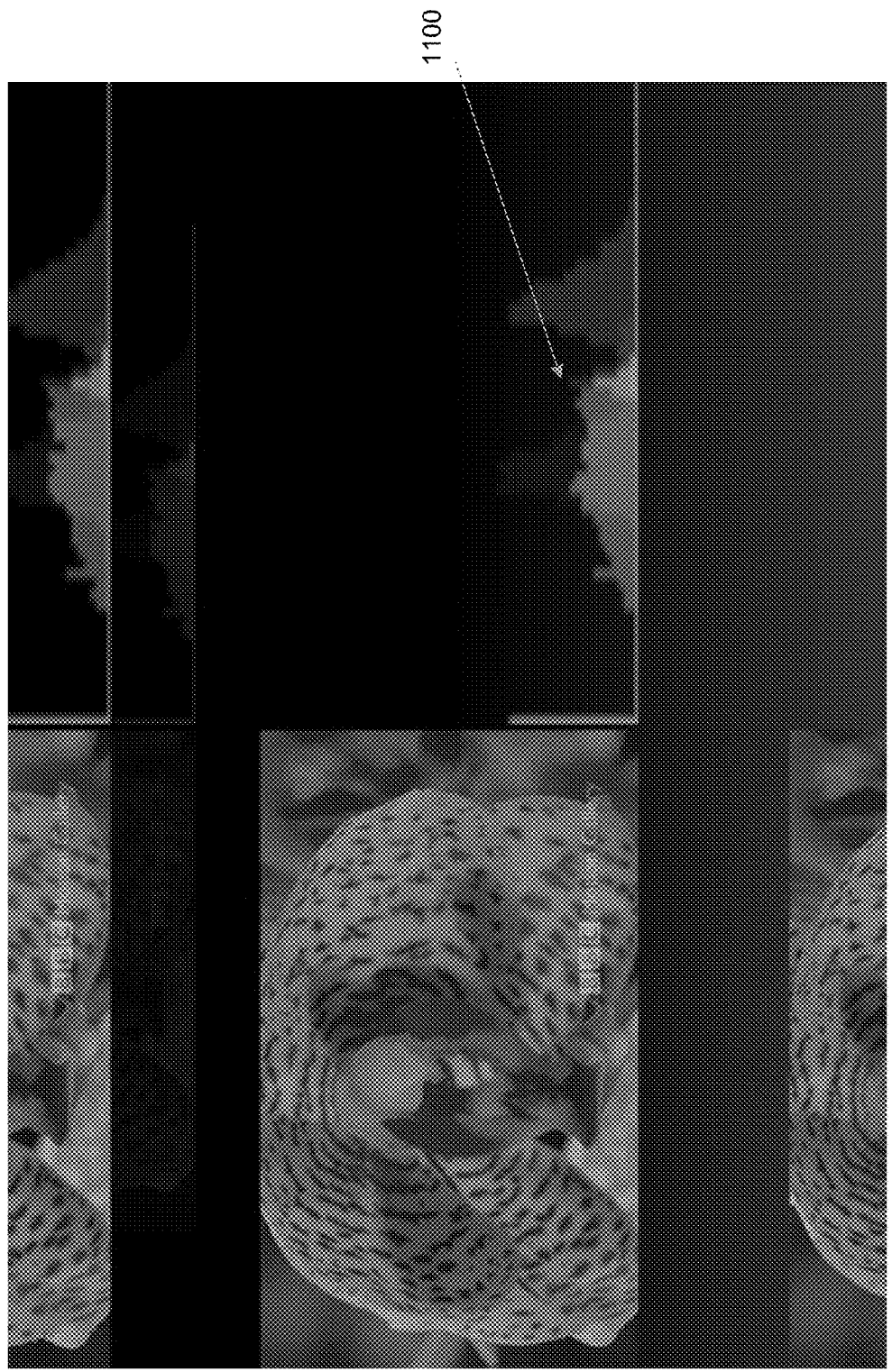
FIG. 11 is a screen shot showing the even further zoomed-in view of a timeline at a location of a focus frame with video frames flipped or rotated of FIG. 10 with image analysis tools displayed along the timeline proximate to the video frames.

In some implementations, the three-dimensional movie browser or editor can display even further zoomed-in views. FIG. 10 is a screen shot showing an even further zoomed-in view of a timeline at a location of a focus frame 1000 with video frames flipped or rotated. The video frames are displayed at an interval 1010 along the timeline depending on the relative position of the video frames to the focus frame. FIG. 11 is a screen shot showing the even further zoomed-in view of a timeline at a location of a focus frame with video frames flipped or rotated of FIG. 10 with image analysis tools 1100 displayed along the timeline proximate to the video frames.

Tracking Objects

Figure 12A:
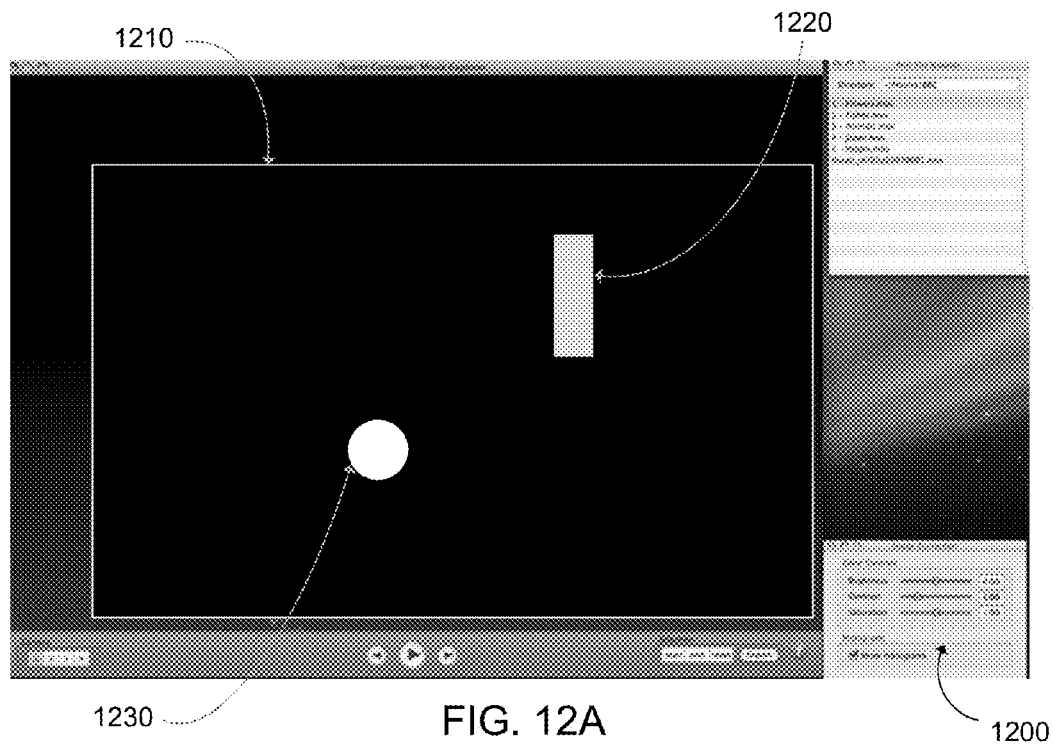
FIG. 12A illustrates an example of a three-dimensional movie browser or editor with objects in a video frame identified for tracking.

FIG. 12A illustrates an example of a three-dimensional movie browser or editor with objects 1220 and 1230 in a video frame 1210 identified for tracking. A user uses tracking controls 1200 to identify an object or objects (e.g., objects 1220 and 1230) for tracking. For example, the user can first determine a focus frame by performing a mouse click on a video frame. Then, the user can use the tracking controls 1200 and mouse clicks to identify objects 1220 and 1230 to be tracked.

Figure 12B:
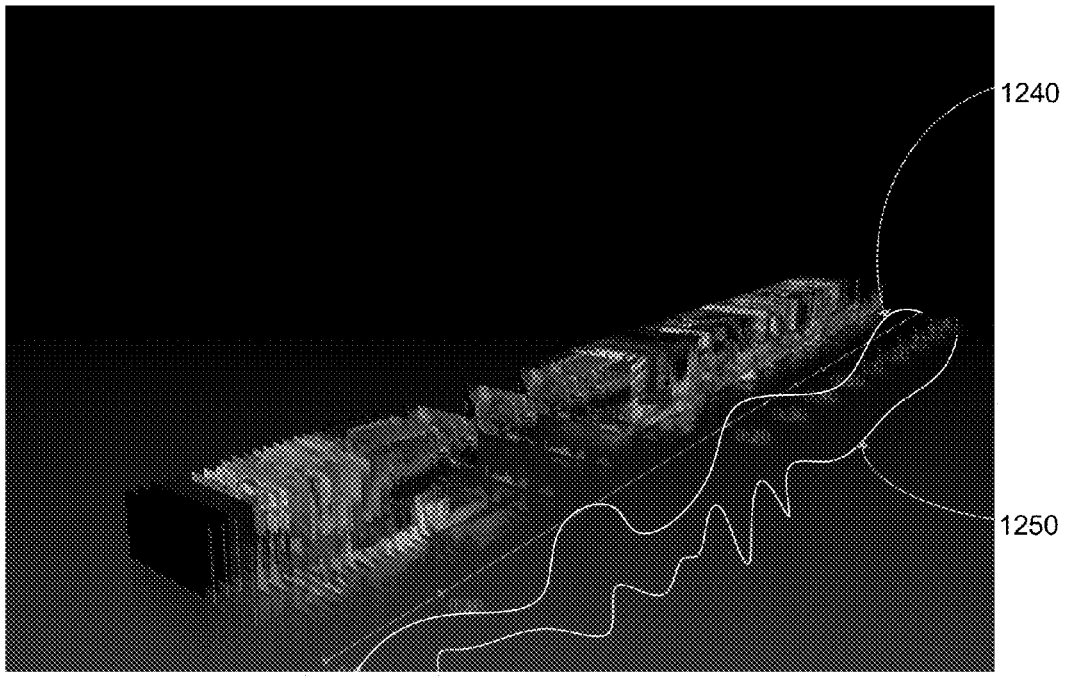
FIG. 12B illustrates an example of video frames displayed concurrently along a timeline with linear paths displayed along the timeline displaying the movement of each identified object.

FIG. 12B illustrates an example of video frames displayed concurrently along a timeline with linear paths 1240 and 1250 displayed along the timeline displaying the movement of each identified object. For each video frame along the timeline, the browser plots points indicating the location of an identified object in the video frames. The browser then connects the points and displays a linear path along the timeline to show the movement of the object in the video frames. For example, the linear path 1240 displays the movement of the object 1230 in the video frames. The linear path 1250 displays the movement of the object 1220 in the video frames.

In some implementations, the points indicating the location of an identified object in the video frames are displayed in the video frames. The browser can display a linear path that connects these points through the video frames.

In some implementations, the linear path has disconnects. For example, if the identified object does not appear in certain video frames, the displayed linear path can have disconnects to indicate the absence of the identified object from the video frames.

Example Method to Display Video Frames

Figure 13:
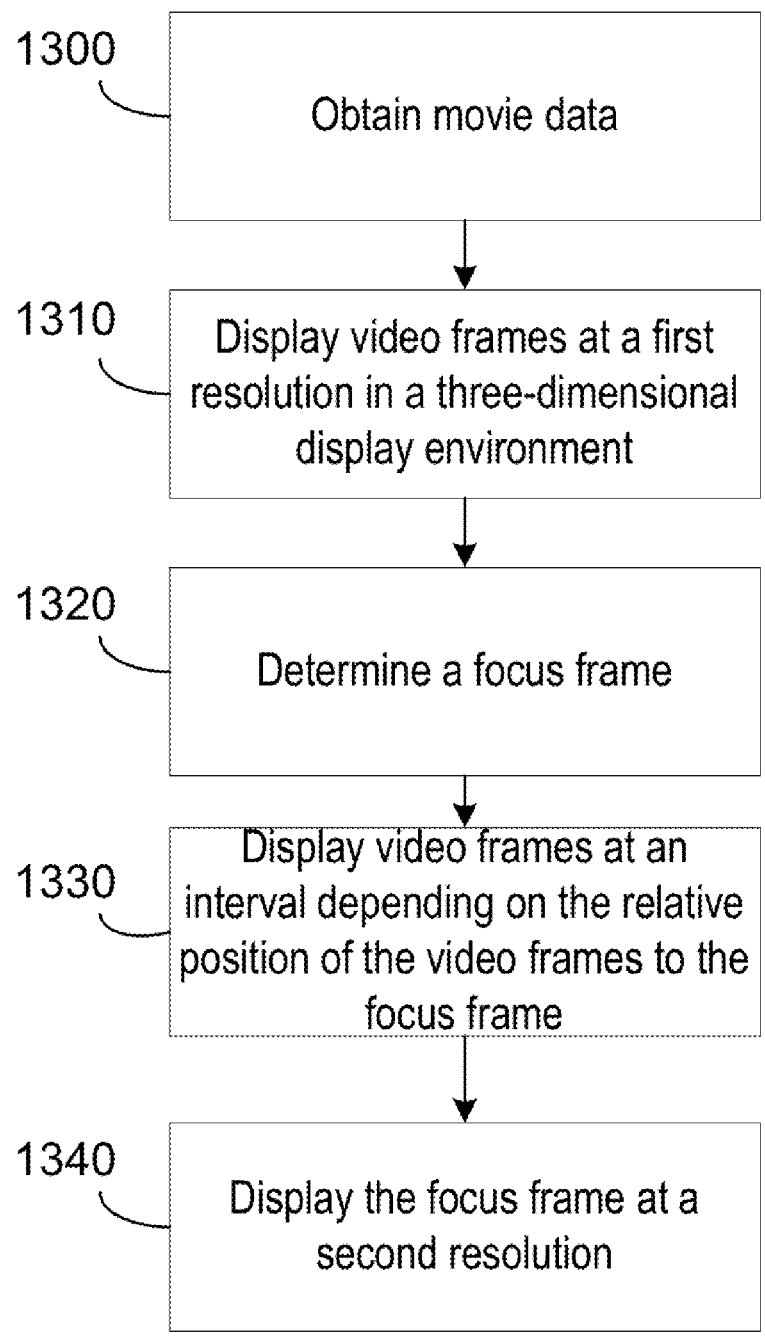
FIG. 13 shows a method to display video frames in a three-dimensional movie browser or editor.

FIG. 13 shows a method to display video frames in a three-dimensional movie browser or editor. Implementations of this method are described in further detail above with respect to FIGS. 1-12. The method includes obtaining movie data (1300). Obtaining movie data can include using a file browser 110 to locate movie data. The movie data can be located in memory, storage devices, computer-readable mediums, etc.

After obtaining movie data, the browser displays video frames at a first resolution in a three-dimensional display environment (1310). The user can determine a focus frame (1320). After determining a focus frame, the browser displays the video frames at an interval depending on the relative position of the video frames to the focus frame (1330). The browser also displays the focus frame at a second resolution (1340).

Example Method to Track Objects

Figure 14:
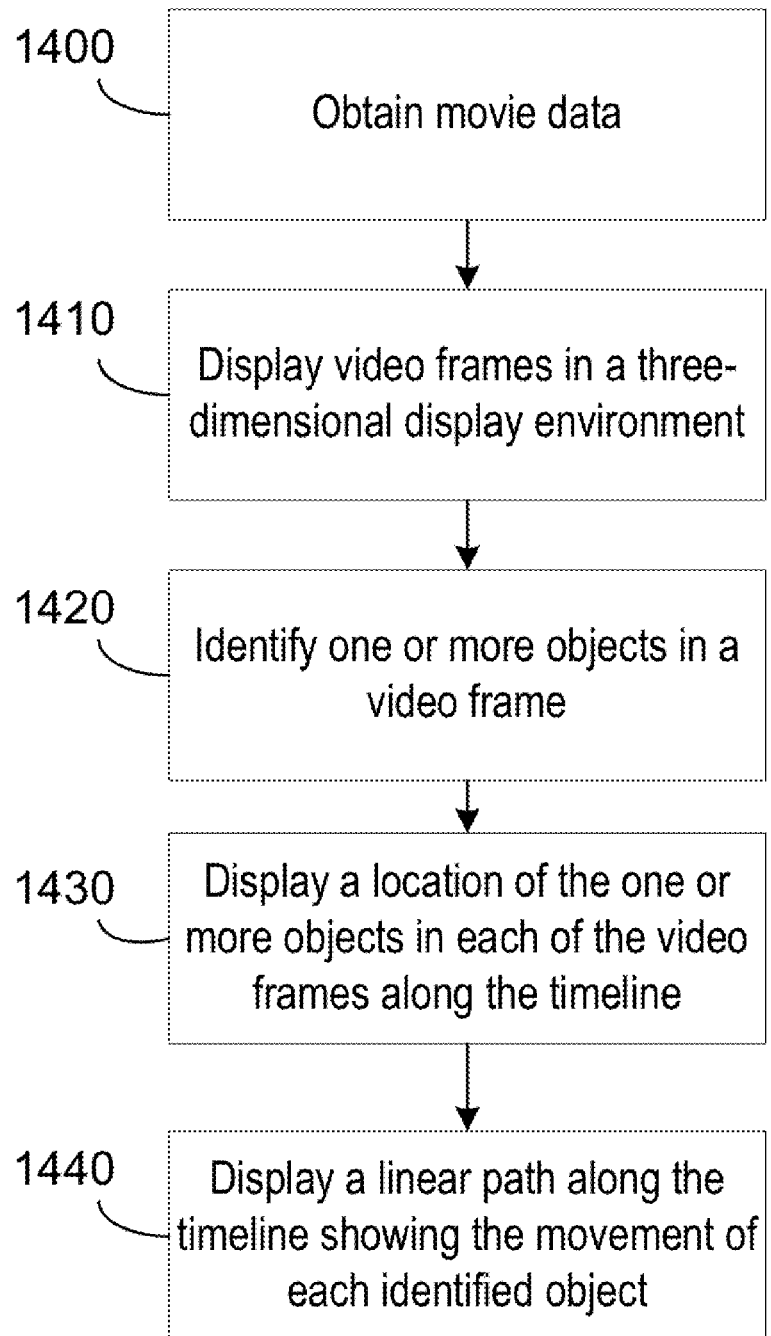
FIG. 14 shows a method to track objects in video frames displayed in a three-dimensional movie browser or editor.

FIG. 14 shows a method to track objects in video frames displayed in a three-dimensional movie browser or editor. Implementations of this method are described in further detail above with respect to FIGS. 12A-12B. The method includes obtaining movie data (1400). Obtaining movie data can include using a file browser 110 to locate movie data. The movie data can be located in memory, storage devices, computer-readable mediums, etc.

After obtaining movie data, the browser displays video frames in a three-dimensional display environment (1410). The user can identify one or more objects in a video frame to track (1420). After determining one or more objects to track, the browser displays a location of the one or more objects in each of the video frames along the timeline (1430). The browser also displays a linear path along the timeline showing the movement of each identified object (1440).

Software Stack

Figure 15:
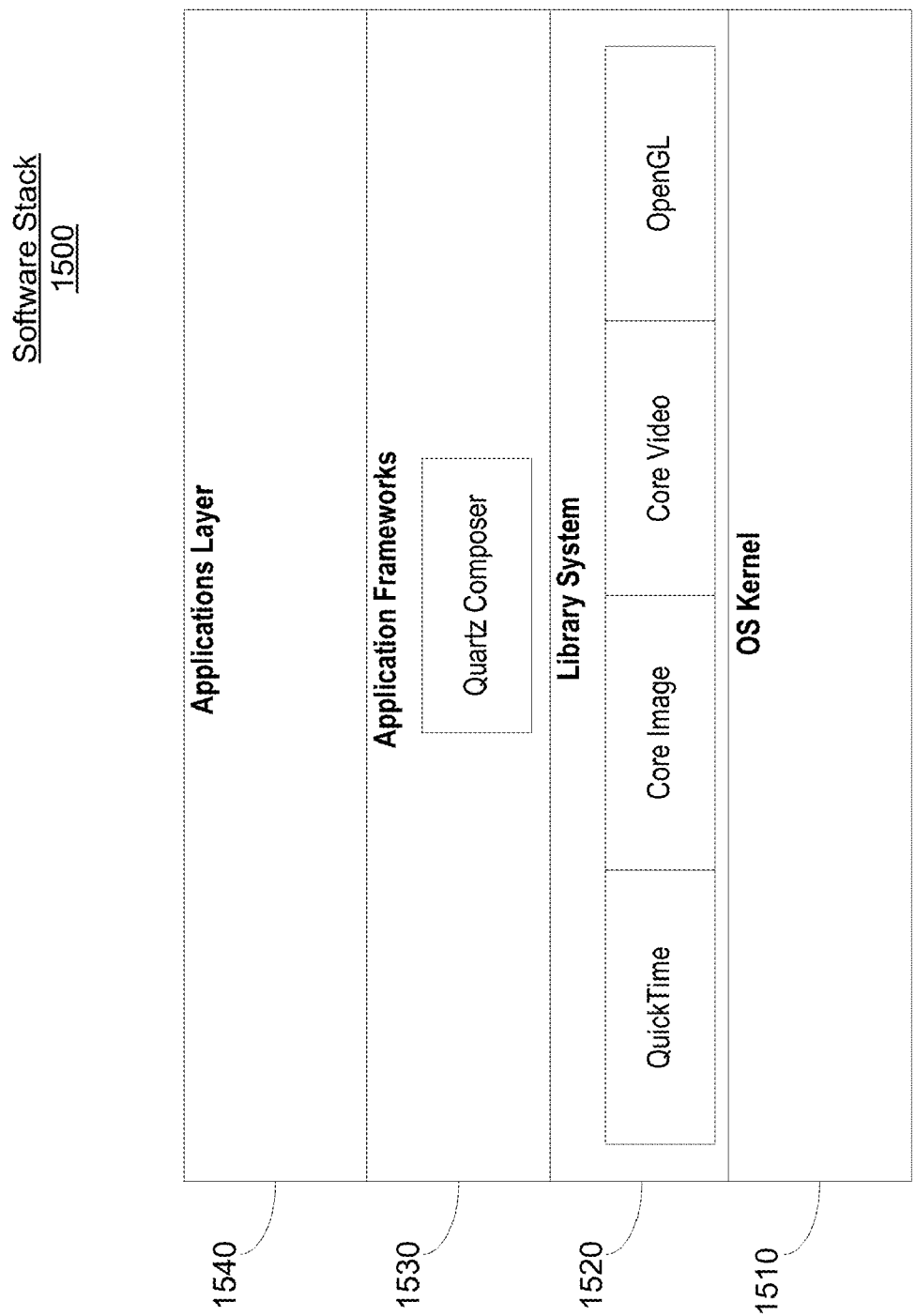
FIG. 15 is a block diagram of an example software stack.

FIG. 15 is a block diagram of an example software stack 1500. In some implementations, the software stack includes an operating system OS kernel 1510 (e.g., a UNIX kernel), a library system 1520, application frameworks 1530 and an applications layer 1540.

The OS kernel 1510 manages the resources and allows other programs to run and use these resources. Some examples of resources include processor, memory, and I/O. For example, the kernel 1510 can determine which running processes should be allocated to a processor, processors or processor cores, allocates memory to the processes and allocates requests from applications and remote services to perform I/O operations. In some implementations, the kernel 1510 provides methods for synchronization and inter-process communications with other devices.

The library system 1520 provides various services applications running in the application layer. Such services can include audio services, video services, database services, image processing services, graphics services, etc. For example, the browser can make use of such services as Quick-Time®, Core Image®, Core Video®, and OpenGL®.

The application framework 1530 provides an object-oriented application environment including classes and Application Programming Interfaces APIs (e.g., Quartz Composer®) that can be used by developers to build applications using well-known programming languages (e.g., Objective-C, Java).

The applications layer 1540 is where various applications exist in the software stack 1500. Developers can use the APIs and environment provided by the application framework 1530 to build applications, such as the three-dimensional movie browser or editor.

System Architecture

Figure 16:
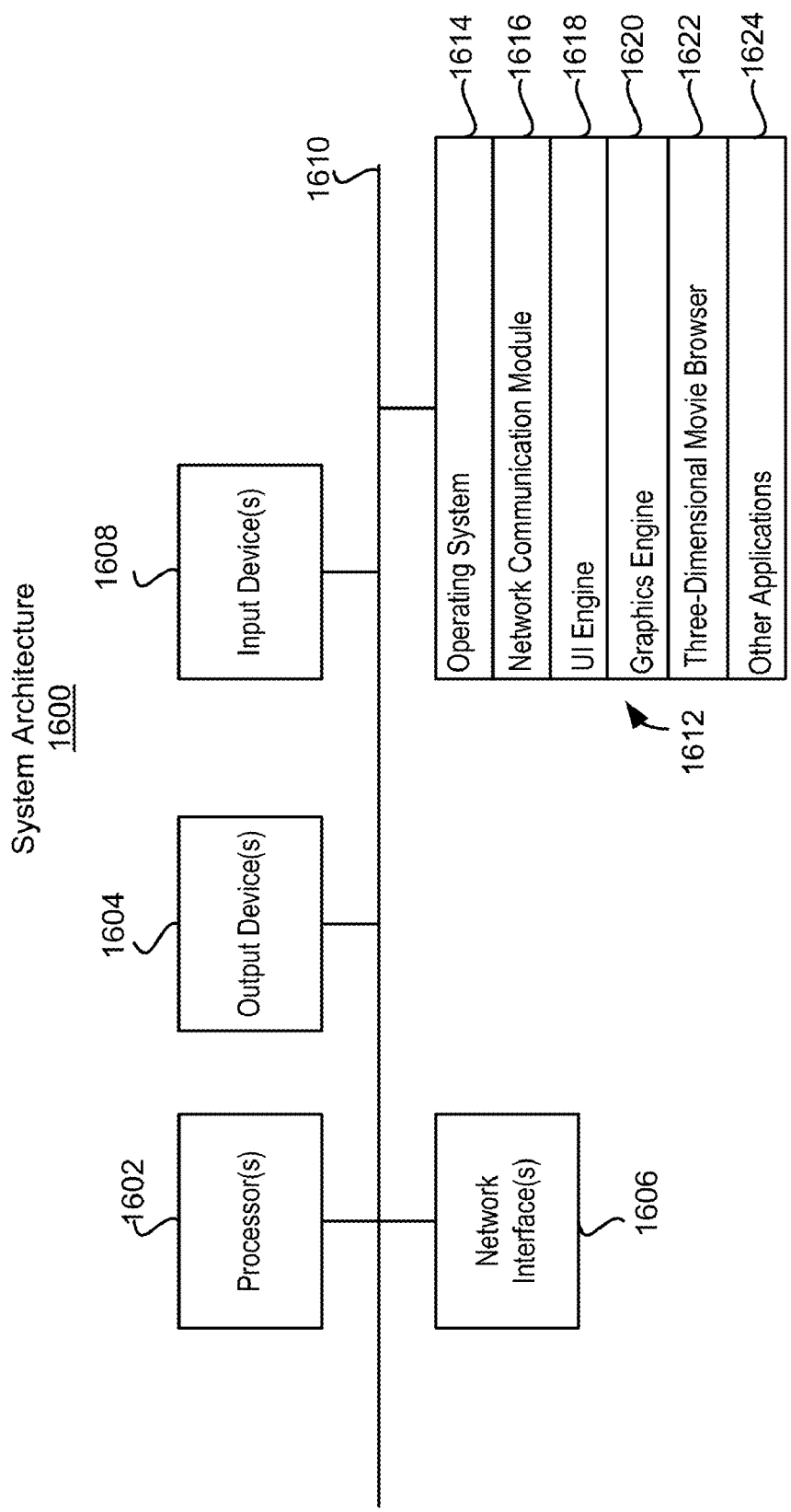
FIG. 16 is a block diagram of an example system architecture.

FIG. 16 is a block diagram of an example system architecture 1600. The described features can be implemented advantageously in one or more computer programs that are executable on a programmable system including at least one programmable processor 1602 coupled by a bus system 1610 to receive data and instructions from, and to transmit data and instructions to, a data storage system 1612, at least one input device 1608, at least one output device 1604, and at least one network interface 1606. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs application-specific integrated circuits.

To provide for interaction with a user, the features can be implemented on a computer having a display device such as a CRT cathode ray tube or LCD liquid crystal display monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network via a network interface. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

In an implementation, the system 1600 includes instructions defining an operating system 1614 stored in a data storage system 1612. Example operating systems can include the MAC OS® X series operating system, the WINDOWS® based operating system, or other operating systems. Upon execution of the operating system instructions, access to various system objects is enabled. Example system objects include data files, the three-dimensional movie browser or editor 1622, other applications 1624, functions, windows, etc. The network communication module 1616 allows the data storage system 1608 to communicate with the system 1600.

To facilitate an intuitive user experience, the system 1600 includes a graphical user interface that provides the user access to the various system objects and conveys information about the system 1600 to the user in an intuitive manner. Upon execution, the UI engine 1618 and the graphics engine 1620 generate a graphical user interface at an output device 1604.

While the three-dimensional movie browser or editor is described herein with respect to a computer system, it should be apparent that the disclosed implementations can be incorporated in, or integrated with, any electronics, media players, game devices, mobile phones, email devices, personal digital assistants (PDAs), embedded devices, televisions, etc. For example, a browser can be used on any user interface including but not limited to hardware devices (e.g., desktops, iPods®, and iPhones®), browser or application windows (e.g., QuickTime®, iTunes®, Final Cut®, and iMovie®), and menu systems (e.g., DVD menus and DVD scene searching tools).

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    obtaining movie data, the movie data corresponding to video frames of a movie; and
    displaying a plurality of video frames in a three-dimensional display environment, wherein the plurality of video frames are displayed concurrently along a timeline in the three-dimensional display environment in temporal order and at spatial intervals relative to adjacent video frames.

2. The method of claim 1, wherein the three-dimensional display environment is a browser or editor.

3. The method of claim 1, further comprising:
    displaying an image analysis tool for each of the video frames displayed in the three-dimensional display environment, wherein the image analysis tools are displayed proximate to the video frames along the timeline.

4. The method of claim 1, further comprising:
    displaying the video frames at a first resolution; and
    determining a focus frame, wherein the focus frame is displayed at a second resolution.

5. The method of claim 4, wherein the second resolution is greater than the first resolution.

6. The method of claim 1, further comprising:
    displaying the video frames at an interval on the timeline depending on the relative position of the video frames to a focus frame.

7. The method of claim 1, further comprising:
    displaying the video frames at an interval on the timeline depending on the optical flow between the video frames.

8. The method of claim 1, further comprising:
    flipping or rotating the video frames; and
    zooming in on the timeline at the location of a focus frame.

9. The method of claim 1, further comprising:
    selecting one or more video frames; and
    editing the selected video frames.

10. The method of claim 1, further comprising:
    identifying one or more objects in a video frame; and
    displaying a location of the one or more objects in each of the video frames along the timeline.

11. A non-transitory computer-readable medium having stored thereon instructions which, when executed by a processor, causes the processor to perform the operations of:
    obtaining movie data, the movie data corresponding to video frames of a movie; and
    displaying a plurality of video frames in a three-dimensional display environment, wherein the plurality of video frames are displayed concurrently along a timeline in the three-dimensional display environment in temporal order and at spatial intervals relative to adjacent vide frames.

12. The computer-readable medium of claim 11, wherein the three-dimensional display environment is a browser or editor.

13. The computer-readable medium of claim 11 having stored thereon instructions which causes the processor to perform operations further comprising:
    displaying an image analysis tool for each of the video frames displayed in the three-dimensional display environment, wherein the image analysis tools are displayed proximate to the video frames along the timeline.

14. The computer-readable medium of claim 11 having stored thereon instructions which causes the processor to perform operations further comprising:
    displaying the video frames at a first resolution; and
    determining a focus frame, wherein the focus frame is displayed at a second resolution.

15. The computer-readable medium of claim 14, wherein the second resolution is greater than the first resolution.

16. The computer-readable medium of claim 11 having stored thereon instructions which causes the processor to perform operations further comprising:
    displaying the video frames at an interval on the timeline depending on the relative position of the video frames to a focus frame.

17. The computer-readable medium of claim 11 having stored thereon instructions which causes the processor to perform operations further comprising:
    displaying the video frames at an interval on the timeline depending on the optical flow between the video frames.

18. The computer-readable medium of claim 11 having stored thereon instructions which causes the processor to perform operations further comprising:
    flipping or rotating the video frames; and
    zooming in on the timeline at the location of a focus frame.

19. The computer-readable medium of claim 11 having stored thereon instructions which causes the processor to perform operations further comprising:
    selecting one or more video frames; and
    editing the selected video frames.

20. The computer-readable medium of claim 11 having stored thereon instructions which causes the processor to perform operations further comprising:
    identifying one or more objects in a video frame; and
    displaying a location of the one or more objects in each of the video frames along the timeline.

21. A system comprising:
    means for obtaining movie data, the movie data corresponding to video frames of a movie; and
    means for displaying a plurality of video frames in a three-dimensional display environment, wherein the plurality of video frames are displayed concurrently along a timeline in the three-dimensional display environment in temporal order and at spatial intervals relative to adjacent video frames.

22. The system of claim 21, further comprising:
    means for displaying the video frames at an interval on the timeline depending on the relative position of the video frames to a focus frame.

23. The system of claim 21, further comprising:
    means for displaying the video frames at an interval on the timeline depending on the optical flow between the video frames.

24. The system of claim 21, further comprising:
    means for identifying one or more objects in a video frame; and
    means for displaying a location of the one or more objects in each of the video frames along the timeline, 25. A system comprising:
    a processor;
    a computer-readable medium coupled to the processor and having instructions contained thereon, which, when executed by the processor, causes the processor to perform the operations of:
        obtaining movie data, the movie data corresponding to video frames of a movie; and
        displaying the video frames in a three-dimensional display environment, wherein the video frames are displayed concurrently along a timeline in the three-dimensional display environment in temporal order and at spatial intervals relative to adjacent video frames.

* * * * *

UNITED STATES PATENT AND TRADEMARK OFFICE
CERTIFICATE OF CORRECTION

PATENT NO. : 8,395,660 B2  Page 1 of 1
APPLICATION NO. : 11/956286
DATED : March 12, 2013
INVENTOR(S) : Quennesson It is certified that error appears in the above-identified patent and that said Letters Patent is hereby corrected as shown below:

In the Claims

Column 10, line 64, in Claim 11, delete "vide" and insert --video--, therefor

Column 12, line 24, in Claim 24, delete "timeline," and insert --timeline.--, therefor Column 12, line 28, in Claim 25, delete "haying" and insert --having--, therefor Signed and Sealed this
Seventh Day of January, 2014

Margaret A. Focarino
*Commissioner for Patents of the United States Patent and Trademark Office*